Figure 1:
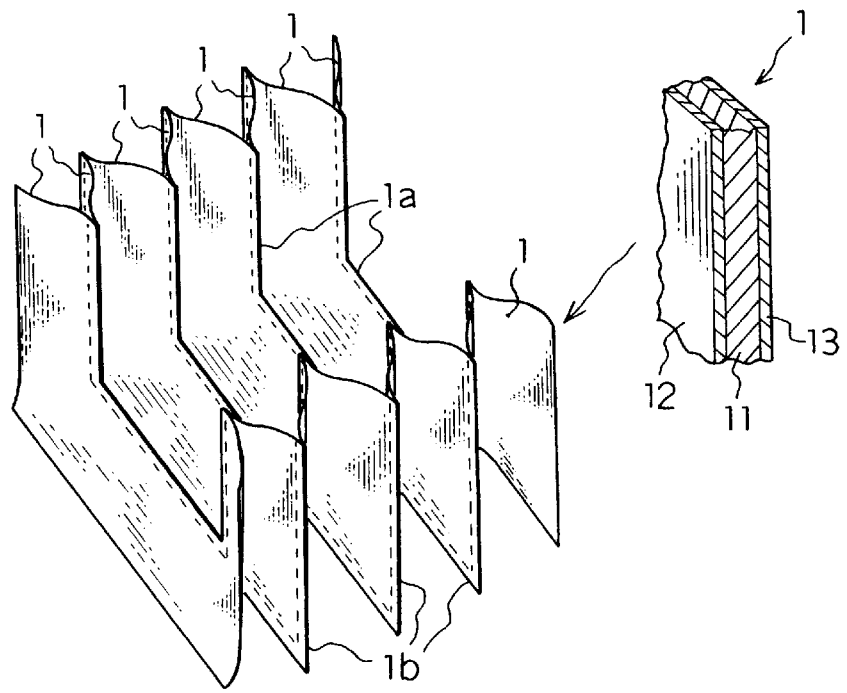

United States Patent [19]
Nemoto et al.

[11] Patent Number: 5,853,855
[45] Date of Patent: Dec. 29, 1998

[54] BELLOWS

[76] Inventors: Takeshi Nemoto; Teruko Nemoto, both of 4-32, Jyomyoji 1-chome, Kamakura 248, Japan

[21] Appl. No.: 638,194

[22] Filed: Apr. 26, 1996

[30] Foreign Application Priority Data

Aug. 10, 1995 [JP] Japan .................................. 7-225741

[51] Int. Cl.[6] .................................................. G12B 1/04
[52] U.S. Cl. .......................... 428/176; 428/179; 428/181
[58] Field of Search .................................... 428/141, 176, 428/179, 175, 181

[56] References Cited

U.S. PATENT DOCUMENTS 5,316,819  5/1994  Nemoto et al. .
5,413,831  5/1995  Nemoto et al. .

FOREIGN PATENT DOCUMENTS 61-202829  9/1986  Japan .
698195  3/1992  Japan .............................. G12B 17/00
455855  9/1992  Japan .............................. B29C 65/50

OTHER PUBLICATIONS

The English translation of JP61–202829, Sep. 1986.
Hydraulics and Pneumatics vol. 46, No. 3, pp. 39–41, 72 by Marks, Mar. 1993.

*Primary Examiner*—Jenna Davis
*Attorney, Agent, or Firm*—Trexler, Bushnell, Giangiorgi & Blackstone, Ltd.

[57] ABSTRACT

A bellows formed from a material sheet is constituted of a core member containing a glass fiber cloth as a matrix and fluorine resin film adhered over entire surfaces at both sides of said core member.

2 Claims, 1 Drawing Sheet

BELLOWS

The present invention relates to an expandable cover for shielding portion to be expanded and contracted or portion to be bent in a machine or so forth for protecting from external disturbance, such as dust, light beam and/or moisture and so forth, particularly to a bellows. More specifically, the invention relates to a bellows having sufficient heat resistance and weather resistance against variation of atmospheric temperature.

There are conventionally known bellows made of flexible material, such as a sheet fabricated by coating a neoprene rubber on a cloth, a sheet fabricated by coating a rubber on a nylon cloth or so forth, such as those disclosed in Japanese Examined Patent Publication (Kokoku) No. Heisei 4-55855, and Japanese Unexamined Patent Publication (KoKai) No. Heisei 4-98195.

However, while a sheet material employed in the conventional bellows may maintain satisfactory performance in operation in a warm region, it has not been designed for operation under more severe condition, such as under cold weather or hot weather. For instance, a bellows installed on an automotive vehicle traveling in a cold area, in which atmospheric temperature is −20° C., will be subject extraordinally low temperature, in the extent of −40° C. due to wind during traveling. Furthermore, since such bellows has poor water repellency, ice may be deposited on the external surface of the bellows to lower operability or performance of the bellows. Finally, the bellows may cause solidification, freezing and rupture. Conversely, the bellows installed on an automotive vehicle traveling in a hot area may subject extraordinarily high temperature in the extend of 80° C. to 100° C. at the resting condition of the vehicle while it may be slightly cooled during traveling. Then, the sheet piece or sheet material may be molten and/or cause rupture.

In view of the problems set forth above, it is an object of the present invention to provide a bellows which has satisfactory low temperature resistance and heat resistance to maintain flexibility and normal operation even at cold weather, such as under the atmospheric temperature at −80° C. or at hot weather, such as under the atmospheric temperature at least +100° C., as well as at warm weather, and is easy to process at low production cost.

According to one aspect of the invention, a bellows is formed from a material sheet which is constituted of a core member containing a glass fiber cloth as a matrix and fluorine resin film adhered over entire surfaces at both sides of said core member.

In the preferred construction, the core member is fabricated by impregnating a synthetic mica into the matrix of the glass fiber cloth. In the alternative, the core member is fabricated by applying a mixture of titanium type fiber and a silicon type binder on the matrix of the glass fiber cloth.

On the other hand, in the preferred construction, the fluorine film is a polytetrafluoroethylene film, a polychlorotrifluoroethylene film or a tetrafluoroethylene-hexafluoropropylene co-polymer film.

According to another aspect of the invention, a material sheet for forming a bellows comprises:

a core member made of a glass fiber cloth based composite material having heat resistance, non-inframeability, water-resistance and flexibility; and fluorine resin film of a fluorine type resin having heat resistance of higher than or equal to 120° C. and low temperature resistance of lower than or equal to −80° C., said fluorine resin film covering at least one side surface of said core member.

Preferably, the glass fiber cloth based composite material is consisted of a glass fiber cloth as a matrix and a synthetic mica impregnated in said glass fiber cloth matrix. Alternatively, the glass fiber cloth based composite material may be consisted of a glass fiber cloth as a matrix and a mixture of titanium fiber and a silicon type binder applied on the surface of said glass fiber cloth matrix.

In such case, said fluorine resin films may be attached on both side surfaces of the core member.

The present invention will be understood more fully from the detailed description given herebelow and from the accompanying drawings of the preferred embodiment of the invention, which, however, should not be taken to be limitative to the present invention, but are for explanation and understanding only.

Figure 2:
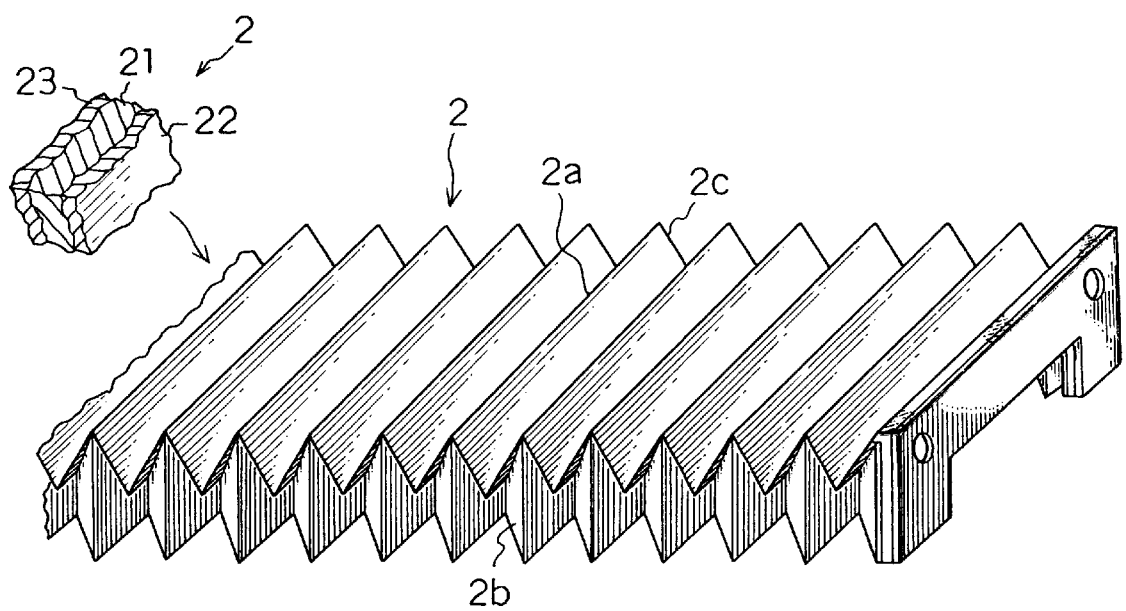

In the drawings:

FIG. 1 is a perspective view of the preferred embodiment of a seam type bellows and an enlarged partial illustration showing a sheet piece forming the bellows; and FIG. 2 is a perspective view of the preferred embodiment of a pleat type bellows and an enlarged partial illustration showing a sheet piece forming the bellows.

The preferred embodiments of bellows according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the drawings, FIG. 1 shows, as a first preferred embodiment, a seam type bellows, and FIG. 2 shows, as a second embodiment, a pleat type bellows according to the present invention.

At first, as shown in FIG. 1, the seam type bellows has a structure, in which a large number of identical size and identical shape of essentially channel-shaped or U-shaped segment sheets 1 are coupled in zigzag manner by alternately sewn at the inner edges 1*a* and outer edges 1*b* by a yarn. The large number of U-shaped segment sheets 1 forming the bellows are prepared by punching or cutting from a not shown material sheet.

In the present invention, each of U-shaped segment sheets 1 forming the seam type bellows is constructed with a core member 11 of glass fiber cloth matrix and fluorine resin films 12 and 13 adhered on the entire areas of both side surfaces of the core member 11, as shown in FIG. 1 in partially enlarged manner.

In concrete, the core member 11 is formed with employing a sheet fabricated by impregnating synthetic mica having heat resistance of 1300° C. to a glass fiber cloth matrix, such as "SGS sheet" (name of goods) available from Taiyo Kabushiki Kaisha, Chiyoda-ku, Tokyo, Japan. This sheet has high heat resistance, non-inflammability, waterproof and flexibility and has high workability in sewing process.

The core member 11 may also be formed from a sheet, in which a mixture of a titanium type fiber and silicon type binder is coated on the glass fiber cloth, such as "Coated Glass M" (name of goods). This also has high heat resistance, non-inflammability, waterproof and flexibility and has high workability in sewing process, in concrete.

The fluorine resin films 12 and 13 adhered on the entire surfaces at both sides of the core member 11 are formed from a polytetrafluoroethylene (PTFE) film, one side of which is processed by surface treatment and is applied a silicon type pressure sensitive adhesive, such as "NITOF-LONE" No. 903UL (trademark), available from Nitto Denko Kabushiki Kaisha. The non-adhesive surface of this film maintains flexibility and water repellency (low friction coefficient) even at low temperature of −80° C. in addition to heat resistance of 260° C. and non-inframeability.

The fluorine resin films 12 and 13 to be employed in the segment sheet 1 of the present invention may also be formed with polychlorotrifluoroethylene (PCTFE) film or tetrafluoroethylene-hexafluoropropylene co-polymer (FEP) film. Both of the foregoing films have non-inframeability. According to ASTMD759-48, the former film has heat resistance of 121° to 150° C. and the later film has heat resistance of 200° C., and the former has low temperature resistance of −195° C. and the later has low temperature resistance of −252° C.

As shown in FIG. 2, the pleat type bellows as the second embodiment of the invention is fabricated by alternately bending 2a one piece of sheet material 2 in zigzag manner and then being both side portions of the sheet material at bending lines parallel to both side edges at right angle to form side wall portions 2b and 2c to form three side covering bellows.

In this embodiment, one piece of the sheet material 2 forming the pleat type bellows is constructed with a core member 21 of glass fiber clock matrix and fluorine resin films 22 and 23 adhered on the entire surfaces at both sides of the core member 21, as shown in the partial enlarged section of FIG. 2.

The core member 21 and the fluorine resin films 22 and 23 adhered on both side surfaces of the core member 21 are the same as those employed in the former embodiment.

As set forth above, according to the present invention, since the material sheet to be formed into the bellows is consisted of the glass fiber clock matrix core member and fluorine resin films adhered on the entire surfaces at both sides of the core member, the sheet may have satisfactory non-inframeability, heat-resistance, low temperature resistance and water repellency (low friction coefficient). Therefore, the bellows of the present invention may maintain flexibility for expansion and contraction which is the most important property of the bellows at any environmental condition, i.e. even at very high or very low temperature environment. Therefore, the bellows according to the present invention may maintain normal and satisfactory performance even under cold weather or hot weather. Also, the bellows according to the present invention is easy to process and can be fabricated at low cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

We claim:

1. A bellows formed from a material sheet which is constituted of a core member fabricated by impregnating a synthetic mica into a matrix of a glass fiber cloth, and fluorine resin film adhered over entire surfaces at both sides of said core member.

2. A bellows as set forth in claim 1, wherein said core member is fabricated by applying a mixture of titanium type fiber and a silicon type binder on the matrix of the glass fiber cloth.

* * * * *